US011177528B2

(12) United States Patent
Jin et al.

(10) Patent No.: US 11,177,528 B2
(45) Date of Patent: *Nov. 16, 2021

(54) BATTERY MODULE AND BATTERY PACK

(71) Applicant: CONTEMPORARY AMPEREX TECHNOLOGY CO., LIMITED, Ningde (CN)

(72) Inventors: Haizu Jin, Ningde (CN); Fei Hu, Ningde (CN); Zhenhua Li, Ningde (CN); Dongyang Shi, Ningde (CN); Rui Yang, Ningde (CN); Yuqun Zeng, Ningde (CN); Yongshou Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,215

(22) Filed: Nov. 21, 2019

(65) Prior Publication Data

US 2020/0365847 A1 Nov. 19, 2020

(30) Foreign Application Priority Data

May 14, 2019 (CN) ......................... 201910398912.1

(51) Int. Cl.
*H01M 50/20* (2021.01)
*H01M 50/15* (2021.01)
(Continued)

(52) U.S. Cl.
CPC ......... *H01M 50/20* (2021.01); *H01M 50/147* (2021.01); *H01M 50/15* (2021.01); *H01M 10/0525* (2013.01); *H01M 10/0565* (2013.01)

(58) Field of Classification Search
CPC .............................. H01M 50/20; H01M 50/15
See application file for complete search history.

(56) References Cited

U.S. PATENT DOCUMENTS 8,497,033 B2 * 7/2013 Chun .................. H01M 50/147 429/163
9,991,498 B2 6/2018 Kwon et al.
(Continued)

FOREIGN PATENT DOCUMENTS

CN 105489965 A 4/2016
CN 106785057 A 5/2017
(Continued)

OTHER PUBLICATIONS

Contemporary Amperex Technology Co., Limited, Extended European Search Report, EP19210855.3, dated Aug. 3, 2020, 8 pgs.
(Continued)

*Primary Examiner* — Ula C Ruddock
*Assistant Examiner* — Thomas H. Parsons
(74) *Attorney, Agent, or Firm* — Morgan, Lewis & Bockius LLP

(57) ABSTRACT

The present disclosure provides a battery module and a battery pack. The battery pack comprises a box and a battery module, the battery module is accommodated in the box. The battery module comprises batteries sequentially arranged in a first direction. The battery comprises an electrode assembly, a case and a cap assembly, the electrode assembly is received in the case, and the cap assembly is connected with the case. The case comprises two first side walls, and the two first side walls are respectively positioned at two sides of the electrode assembly in the first direction. The first side walls of two adjacent batteries face each other. An area of the first side wall is defined as $S_1$, a distance between the electrode assemblies of two adjacent batteries in the first direction is defined as D, $S_1$ and D satisfying a relationship:

$$1.2\times10^{-5}\ \text{mm}^{-1}\leq D/S_1\leq 500\times10^{-5}\ \text{mm}^{-1}.$$

18 Claims, 3 Drawing Sheets

(51) Int. Cl.

| | |
|---|---|
| ***H01M 50/147*** | (2021.01) |
| *H01M 10/0525* | (2010.01) |
| *H01M 10/0565* | (2010.01) |

(56) References Cited

U.S. PATENT DOCUMENTS

2007/0015050 A1* 1/2007 Jung ..................... H01M 50/20
429/152
2019/0363321 A1* 11/2019 Lee ....................... H01M 50/10

FOREIGN PATENT DOCUMENTS

CN 209401701 U 9/2019
WO WO-2019107563 A1 6/2019

OTHER PUBLICATIONS

V.Ruiz, “JRC exploratory research: Safer Li-ion batteries by preventing thermal propagation”, JRC Technical Reports, Oct. 31, 2018, p. 31,figure 6, Workshop report: summary & outcomes( JRC Petten, Netherlands, Mar. 8-9, 2018), 54 pgs.

Jin, Office Action, U.S. Appl. No. 17/137,172, dated Feb. 25, 2021, 22 pgs.

Jin, Final Office Action, U.S. Appl. No. 17/137,172, dated Apr. 16, 2021, 26 pgs.

Jin, Notice of Allowance, U.S. Appl. No. 17/137,172, dated Jun. 23, 2021, 9 pgs.

* cited by examiner

BATTERY MODULE AND BATTERY PACK

CROSS-REFERENCE TO RELATED APPLICATIONS

The present application claims priority to Chinese patent application No. CN 201910398912.1, filed on May 14, 2019, which is incorporated herein by reference in its entirety.

TECHNICAL FIELD

The present disclosure relates to the field of battery, and particularly relates to a battery module, a battery pack and a vehicle.

BACKGROUND

A secondary battery has the advantages of high energy density, long working life, energy saving, environmental protection and the like, and has been widely applied to various fields, such as new energy vehicle, energy storage power station and the like.

A battery pack generally comprises a box and a battery module accommodated in the box, and the battery module comprises batteries arranged sequentially. However, when an extreme situation of one battery occurs, for example, overcharge, short circuit or the like, the one battery will generate a large amount of heat; the heat will be transferred to other battery adjacent to the one battery, which leads to the other battery suffering thermal runaway, and further result in failure of the battery module and safety risk.

SUMMARY

In view of the problem existing in the background, an object of the present disclosure is to provide a battery module, a battery pack and a vehicle, which can promote the cycle performance and the safety performance of the battery.

In order to achieve the above object, the present disclosure provides a battery module, a battery pack and a vehicle.

The battery module comprises batteries sequentially arranged in a first direction. The battery comprises an electrode assembly, a case and a cap assembly, the electrode assembly is received in the case, and the cap assembly is connected with the case. The case comprises two first side walls, and the two first side walls are respectively positioned at two sides of the electrode assembly in the first direction. The first side walls of two adjacent batteries face each other. An area of the first side wall is defined as $S_1$, a distance between the electrode assemblies of two adjacent batteries in the first direction is defined as D, $S_1$ and D satisfy a relationship: $1.2\times10^{-5}\ mm^{-1}\leq D/S_1\leq500\times10^{-5}\ mm^{-1}$.

The area $S_1$ of the first side wall and the distance D between the electrode assemblies of two adjacent batteries in the first direction satisfy a relationship: $1.6\times10^{-5}\ mm^{-1}\leq D/S_1\leq250\times10^{-5}\ mm^{-1}$.

The distance D between the electrode assemblies of two adjacent batteries in the first direction is 1.2 mm-10 mm, the area $S_1$ of the first side wall is 4000 $mm^2$-60000 $mm^2$.

The case further comprises two second side walls, the two second side walls are respectively positioned at two sides of the electrode assembly in a second direction, the second direction is perpendicular to the first direction. An area of the second side wall is defined as $S_2$, and $S_2$ is larger than $S_1$.

The electrode assembly comprises two first surfaces and two second surfaces, and an area of the first surface is larger than an area of the second surface; the first surface faces the second side wall in the second direction, and the second surface faces the first side wall in the first direction.

The electrode assembly comprises a first electrode plate, a second electrode plate and a separator provided between the first electrode plate and the second electrode plate. The first electrode plate, the separator and the second electrode plate are wound to a flat shape, and the two first surfaces are flat surfaces and face each other in the second direction; or the first electrode plate, the separator and the second electrode plate are stacked in the second direction.

Preferably, the first electrode plate, the separator and the second electrode plate are wound to a flat shape, and at least a part of the second surface is in the shape of arc.

A dimension of the battery module in the first direction is larger than a dimension of the battery module in the second direction.

The area $S_1$ of the first side wall and the distance D between the electrode assemblies of two adjacent batteries in the first direction satisfy a relationship: $5\times10^{-5}\ mm^{-1}\leq D/S_1\leq200\times10^{-5}\ mm^{-1}$.

The battery module further comprises a first adhesive member, and the first adhesive member is positioned between two adjacent batteries and connects the first side walls of the two adjacent batteries. An area of the first side wall covered by the first adhesive member is defined as $S_3$, $S_3$ and $S_1$ satisfy a relationship: $0.25\leq S_3/S_1\leq0.95$.

A thickness of the first adhesive member is defined as T, $S_3$ and T satisfy a relationship: $300\ mm\leq S_3/T\leq32000\ mm$.

An elastic modulus of the first adhesive member is defined as E, E and T satisfy a relationship: $E\times T\geq50$ MPa·mm.

The first adhesive member is an adhesive, and the adhesive is one or more selected from a group consisting of epoxy resin, polyurethane and acrylic resin.

The battery pack comprises a box and the battery module, and the battery module is accommodated in the box. The vehicle comprises a vehicle body and the battery pack provided to the vehicle body.

The present disclosure has the following beneficial effects: the area $S_1$ of the first side wall and the distance D between the electrode assemblies of two adjacent batteries in the first direction have significant influence on the cycle performance and the safety performance of the batteries. In the present disclosure, the area $S_1$ of the first side wall and the distance D between the electrode assemblies of two adjacent batteries in the first direction are comprehensively considered, when a relationship, $1.2\times10^{-5}\ mm^{-1}\leq D/S_1\leq500\times10^{-5}\ mm^{-1}$, is satisfied, it can ensure the cycle performance and the safety performance of batteries at the same time.

Figure 1:
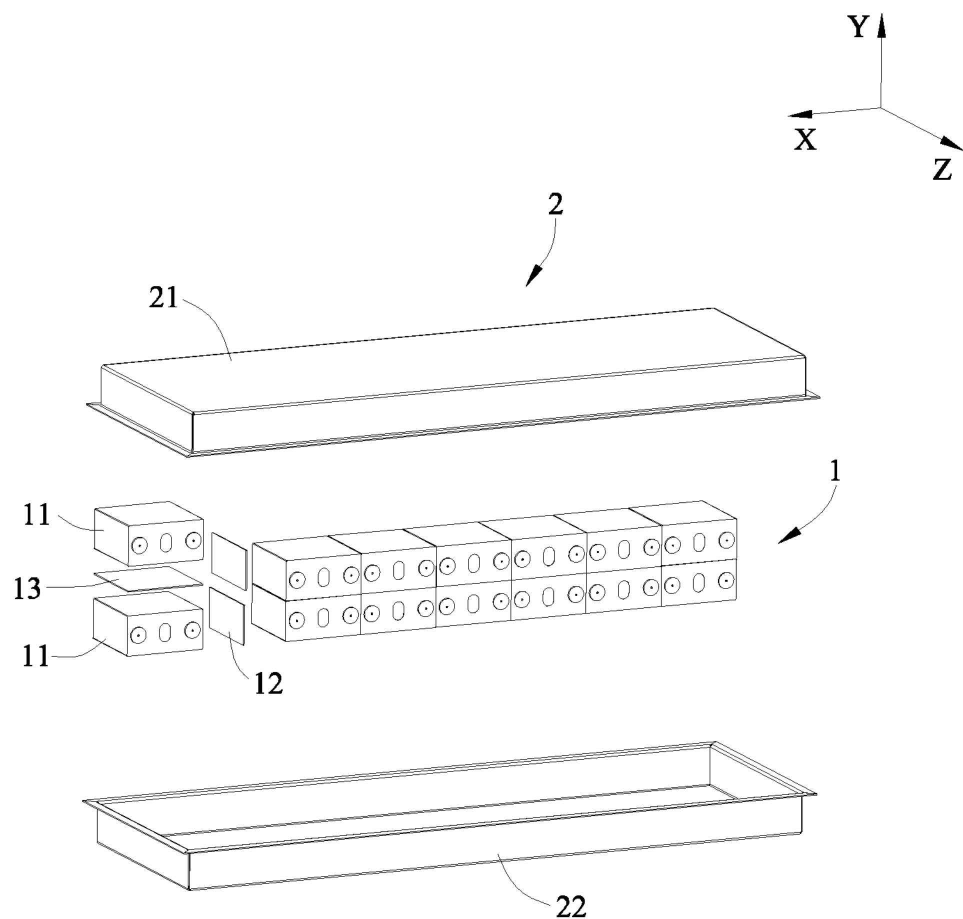
FIG. 1 is an exploded view of a battery pack according to the present disclosure.

Reference numerals in figures are represented as follows:
1 battery module
11 battery
111 electrode assembly
111*a* first electrode plate
111*b* second electrode plate
111*c* separator
111*d* first surface
111*e* second surface
112 case
112*a* first side wall
112*b* second side wall
112*c* third side wall
113 cap assembly
113*a* cap plate
113*b* electrode terminal
12 first adhesive member
13 second adhesive member
2 box
21 upper box cover
22 lower box body
X first direction
Y second direction
Z third direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", and "third" are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present disclosure will be further described in detail in combination with the exemplary embodiments and the figures.

In the description of the present disclosure, a horizontal direction is a direction parallel to a horizontal plane, the horizontal direction not only includes a direction absolutely parallel to the horizontal plane, but also a direction substantially parallel to the horizontal plane conventionally cognized in engineering. The vertical direction is a direction perpendicular to the horizontal plane, the vertical direction not only includes a direction absolutely perpendicular to the horizontal plane, but also a direction substantially perpendicular to the horizontal plane conventionally cognized in engineering. Furthermore, spatially relative terms, such as "above", "below", "top", "bottom" and the like, described in the present disclosure, are understood relative to the vertical direction.

The present disclosure provides a vehicle, the vehicle comprises a vehicle body and a battery pack, the battery pack is provided to the vehicle body. The vehicle is a new energy vehicle, for example, the vehicle may be a pure electric vehicle, hybrid power vehicle or extended range vehicle. The vehicle body is provided with a drive motor, the drive motor is electrically connected with the battery pack, the battery pack supplies electric energy, and the drive motor is connected with a wheel on the vehicle body via a transmission mechanism, thereby driving the vehicle. Preferably, the battery pack may be horizontally provided to a bottom of the vehicle body.

FIG. 1 is an exploded view of a battery pack according to the present disclosure. The battery pack of the present disclosure comprises a battery module 1 and a box 2, the battery module 1 is accommodated in the box 2.

The box 2 comprises an upper box cover 21 and a lower box body 22. In FIG. 1, the upper box cover 21 and the lower box body 22 are separated. The upper box cover 21 and the lower box body 22 are connected together in sealing, and an accommodating cavity is formed between the upper box cover 21 and the lower box body 22. The upper box cover 21 and the lower box body 22 may be made of aluminum, aluminum alloy or other metal.

The battery module 1 is accommodated in the accommodating cavity of the box 2. The battery module 1 may be provided as one or plurality in number. When the battery module 1 is provided as plurality in number, the plurality of the battery modules 1 may be arranged in the horizontal direction. The battery module 1 comprises batteries 11 sequentially arranged in a first direction X; the first direction X is either parallel to the horizontal direction or the vertical direction. The batteries 11 are secondary batteries which can charge and discharge repeatedly. The batteries 11 may be electrically connected via busbars.

The battery module 1 further comprises two end plates not shown in the figures and a strap not shown in the figures. The two end plates are respectively provided at two ends of the batteries 11 in the first direction X; the strap encircles the batteries 11 and the two end plates. The end plate may be made of metal material, such as aluminum, aluminum alloy or the like, or made from insulation material.

Figure 2:
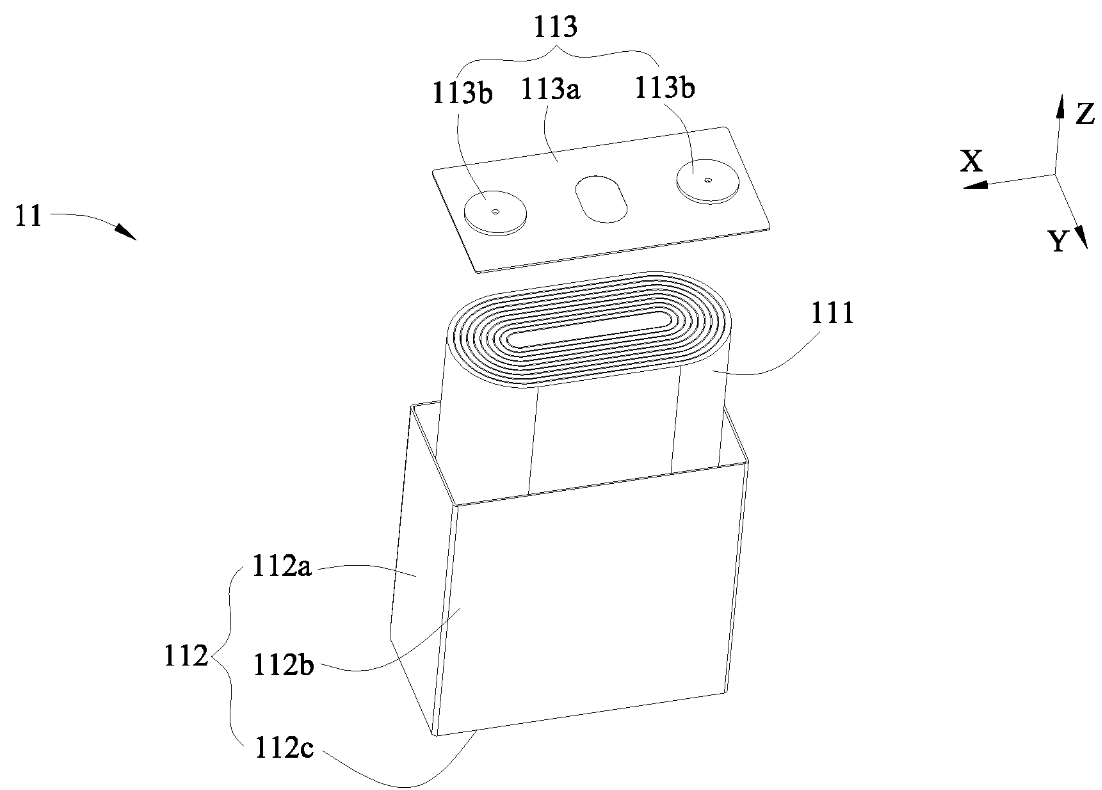
FIG. 2 is an exploded view of a battery of a battery module according to the present disclosure.

Referring to FIG. 2, the battery 11 comprises an electrode assembly 111, a case 112 and a cap assembly 113. The electrode assembly 111 is received in the case 112, and the electrode assembly 111 comprises a first electrode plate 111*a*, a second electrode plate 111*b* and a separator 111*c* provided between the first electrode plate 111*a* and the second electrode plate 111*b*.

The case 112 may be made of metal material or composite material. For example, in an embodiment, the case 112 is integrally made of metal material, such as aluminum, aluminum alloy, nickel-plated steel or the like. Alternatively, in another embodiment, the case 112 may comprises a base and an insulation layer, the base is made of metal material, such as aluminum, aluminum alloy, nickel-plated steel or the like, the insulation layer is provided to an outer surface of the base by coating, bonding or the like; at this time, the base made of metal material can ensure the strength of the case 112, and the insulation layer can promote the insulating performance of the case 112.

The case 112 may have a hexahedron shape or other shape. The case 112 has an opening, and the electrode assembly 111 can be placed into the case 112 via the opening.

The cap assembly 113 comprises a cap plate 113*a* and an electrode terminal 113*b*, the electrode terminal 113*b* is provided to the cap plate 113*a*. The cap plate 113*a* may be made of metal material, such as aluminum, aluminum alloy or the like, a dimension of the cap plate 113*a* is matched with a dimension of the opening of the case 112. The cap plate 113*a* is connected to the case 112 by welding and covers the opening of the case 112, thereby sealing the electrode assembly 111 in the case 112.

The electrode terminal 113*b* is fixed with the cap plate 113*a* by welding, riveting or the like. The electrode terminal 113*b* is provided as two in number and the two electrode terminals 113*b* are respectively electrically connected with the first electrode plate 111*a* and the second electrode plate 111*b*.

In the electrode assembly 111, one of the first electrode plate 111*a* and the second electrode plate 111*b* is a positive electrode plate, the other one of the first electrode plate 111*a* and the second electrode plate 111*b* is a negative electrode plate, and the separator 111*c* is an insulator provided between the positive electrode plate and the negative electrode plate. For example, the first electrode plate 111*a* is the positive electrode plate, and the first electrode plate 111*a* comprises a first current collector and a first active material layer coated on a surface of the first current collector; the first current collector may be an aluminum foil, the first active material layer comprises ternary material, lithium manganese oxide or lithium iron phosphate. The second electrode plate 111*b* is the negative electrode plate, and the second electrode plate 111*b* comprises a second current collector and a second active material layer coated on a surface of the second current collector; the second current collector may be a copper foil, the second active material layer comprises graphite or silicon.

Figure 5:
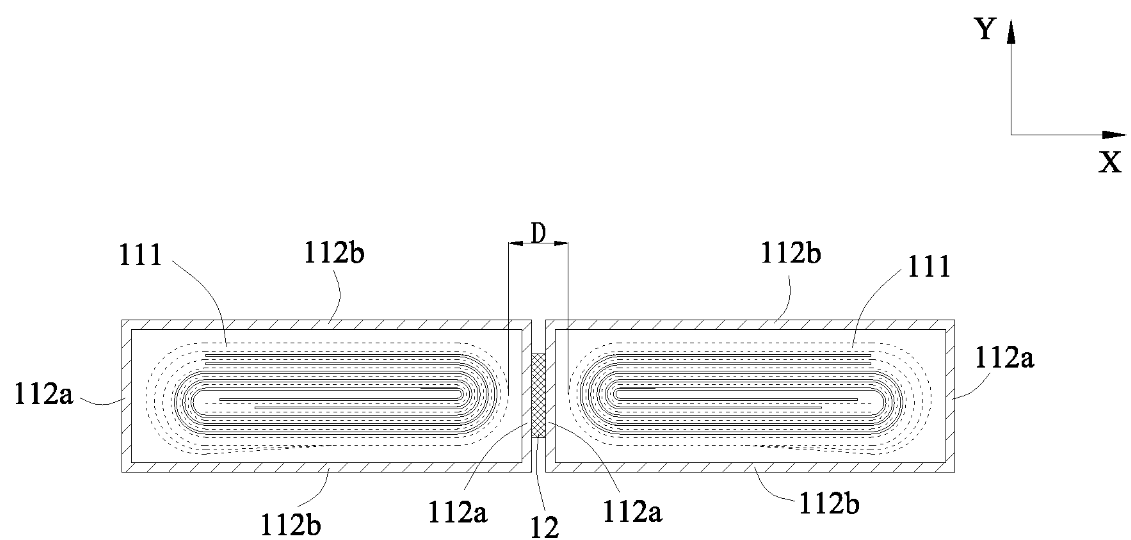
FIG. 5 is a schematic view of the battery module according to the present disclosure.

Referring to FIG. 5, the case 112 comprises two first side walls 112*a*, and the two first side walls 112*a* are respectively positioned at two sides of the electrode assembly 111 in the first direction X. The first side wall 112*a* is substantially in the shape of flat plate and perpendicular to the first direction X. The first side walls 112*a* of two adjacent batteries 11 face each other; preferably, the first side walls 112*a* of two adjacent batteries 11 are fixedly connected with each other. Certainly, the first side walls 112*a* of two adjacent batteries 11 can be directly connected or indirectly connected via other member.

In the charge process or discharge process, the electrode assembly 111 will generate a certain amount of heat; a part of the heat is transferred to the first side wall 112*a*, and the heat in the first side wall 112*a* dissipates to outside. An area of the first side wall 112*a* is defined as $S_1$. The larger a value of $S_1$ is, the higher the heat dissipating efficiency of the first side wall 112*a* is, and the more easily the heat in the electrode assembly 111 dissipates to outside. Correspondingly, the smaller the value of $S_1$ is, the lower the heat dissipating efficiency of the first side wall 112*a* is, and the more difficultly the heat in the electrode assembly 111 dissipates to outside.

Under normal working state, if the value of $S_1$ is too small, the heat dissipating efficiency of the electrode assembly 111 is too low, and the heat is easily accumulated in the electrode assembly 111. When the heat in electrode assembly 111 is accumulated to a certain extent, it will lead to the chemical reaction in the electrode assembly 111 vigorous, and influence the cycle life of the electrode assembly 111. Therefore, by increasing the value of $S_1$, it improves the heat dissipating efficiency of the electrode assembly 111 and ensures the cycle life of the electrode assembly 111.

The electrode assemblies 111 of two adjacent batteries 11 can also transfer heat to each other via the first side walls 112*a*. However, when an extreme situation of one battery 11 occurs, for example, overcharge, short circuit or the like, the one battery 11 suffers thermal runaway and generates a large amount of heat. The generated heat will be transferred to the electrode assembly 111 of an adjacent battery 11 via the first side walls 111*a*. If the value of $S_1$ is too large, the heat generated by the battery 11 suffering thermal runaway will be rapidly transferred to the adjacent battery 11, which leads to the adjacent battery 11 suffering thermal runaway, causes failure of the battery module 1 and results in safety risk.

A distance between the electrode assemblies 111 of two adjacent batteries 11 in the first direction X is defined as D; it should be noted, D is the minimum distance between the electrode assemblies 111 of two adjacent batteries 11 in the first direction X.

The larger a value of D is, the longer a heat transfer path between the electrode assemblies 111 of two adjacent batteries 11 is, and the less the influence of the electrode assemblies 111 of two adjacent batteries 11 on each other's temperature is. When one battery 11 suffers thermal runaway, the heat transfer path between the electrode assembly 111 of other battery 11 and the electrode assembly 111 suffering thermal runaway is longer, the electrode assembly 111 suffering thermal runaway has a less influence on the electrode assembly 111 of the other battery 11, thereby effectively postponing the time of the other battery 11 which will suffers thermal runaway and reducing safety risk.

However, the larger the value of D is, the longer a distance between the electrode assembly 111 and the first side wall 112*a* of each battery 11 is, and the less easily the heat generated by the electrode assembly 111 is transferred to the first side wall 112*a*, and the lower the heat dissipating efficiency of the electrode assembly 111 is. The heat generated in the electrode assembly 111 under normal working state is easy to accumulate, which leads to the chemical reaction in the electrode assembly 111 vigorous, and affects the cycle life of the electrode assembly 111.

The smaller the value of D is, the shorter the heat transfer path between the electrode assemblies 111 of two adjacent batteries 11 is, and the more the influence of the electrode assemblies 111 of two adjacent batteries 11 on each other's temperature is. When one battery 11 suffers thermal runaway, the heat transfer path between the electrode assembly 111 of the other battery 11 and the electrode assembly 111 suffering thermal runaway is shorter, the electrode assembly 111 suffering thermal runaway has more influence on the electrode assembly 111 of the other battery 11, and the electrode assembly 111 of the other battery 11 is easy to suffer thermal runaway, thereby causing failure of the battery module 1 and resulting in safety risk.

In addition, in the charge process or discharge process of the electrode assembly 111, the electrode plate will expand along its thickness direction. When the electrode plate expands, the first side wall 112*a* will be pressed by the electrode assembly 111 and deform. The smaller the value of D is, when the electrode assembly 111 expands, the larger an expanding force applied to the first side wall 112*a* by the electrode assembly 111 is. The batteries 11 are arranged in the first direction X, the expanding forces of the batteries 11 will accumulate in the first direction X and generate a larger composite force; if the composite force is excessively large, the battery 11 is easily crushed.

In conclusion, the area $S_1$ of the first side wall 112*a* and the distance D between the electrode assemblies 111 of two adjacent batteries 11 in the first direction X have significant influence on the cycle performance and the safety performance of the batteries 11. In the present disclosure, the area $S_1$ of the first side wall 112*a* and the distance D between the electrode assemblies 111 of two adjacent batteries 11 in the first direction X are comprehensively considered, when a relationship, $1.2\times10^{-5}\ mm^{-1}\leq D/S_1\leq 500\times10^{-5}\ mm^{-1}$, is satisfied, it can ensure the cycle performance and the safety performance of batteries 11 at the same time.

Specifically, if the value of $D/S_1$ is smaller than $1.2\times10^{-5}\ mm^{-1}$, the value of D is small and the value of $S_1$ is large. When one battery 11 suffers thermal runaway, the heat transfer path between the electrode assembly 111 of the other battery 11 and the electrode assembly 111 suffering thermal runaway is shorter, and the heat transfer area is larger, the electrode assembly 111 suffering thermal runaway has a greater influence on the electrode assembly 111 of the other battery 11, and the electrode assembly 111 of the other battery 11 is easy to suffer thermal runaway, thereby causing failure of the battery module 1 and resulting in safety risk. When the electrode assembly 111 expands, an expanding force applied to the first side wall 112*a* is excessively large; when the expanding forces of the batteries 11 accumulate in the first direction X, the battery 11 is easily crushed.

If the value of $D/S_1$ is larger than $500\times10^{-5}\ mm^{-1}$, the value of D is larger and the value of $S_1$ is smaller. At this time, the value of D is larger, the distance between the electrode assembly 111 and the first side wall 112*a* of each battery 11 is larger, when the electrode assembly 111 works normally, the heat generated in the electrode assembly 111 is not easily transferred to the first side wall 112*a*. At the same time, the value of $S_1$ is smaller, and the heat dissipating efficiency of the first side wall 112*a* to outside is lower. Therefore, when the electrode assembly 111 works normally, the generated heat can not be released in time, the heat is easily accumulated in the electrode assembly 111, which leads to the chemical reaction in the electrode assembly 111 vigorous and influences the cycle life of the electrode assembly 111.

Preferably, the area $S_1$ of the first side wall 112*a* and the distance D between the electrode assemblies 111 of two adjacent batteries 11 in the first direction X satisfy a relationship: $1.6\times10^{-5}\ mm^{-1}\leq D/S_1\leq 250\times10^{-5}\ mm^{-1}$.

The distance D between the electrode assemblies 111 of two adjacent batteries 11 in the first direction X is 1 mm-20 mm, preferably 1.2 mm-10 mm. The area $S_1$ of the first side wall 112*a* is 4000 $mm^2$-60000 $mm^2$.

The case 112 further comprises two second side walls 112*b*, the two second side walls 112*b* are respectively positioned at two sides of the electrode assembly 111 in a second direction Y, the second direction Y is perpendicular to the first direction X. Preferably, the second direction Y is parallel to the vertical direction. The second side wall 112*b* is substantially in the shape of flat plate and perpendicular to the second direction Y.

The two first side walls 112*a* and the two second side walls 112*b* encircle the electrode assembly 111. In the charge process or discharge process, the heat generated in the electrode assembly 111 can be transferred to outside via the first side walls 112*a* and the second side walls 112*b*.

Preferably, an area of the second side wall 112*b* is defined as $S_2$, and $S_2$ is larger than $S_1$. In the present disclosure, the batteries 11 are arranged in the first direction X, the first side wall 112*a* having smaller area can reduce the influence of the electrode assemblies 111 of two adjacent batteries 11 on each other's temperature is. At the same time, the second side wall 112*b* has a less influence on the temperature of the other battery 11, so the second side wall 112*b* can has a larger area to fully dissipate heat to outside.

The case 112 further comprises a third side wall 112*c*, the third side wall 112*c* is connected with the first side wall 112*a* and the second side wall 112*b*, and the third side wall 112*c* is positioned at a side of the electrode assembly 111 away from the cap plate 113*a*.

Figure 3:
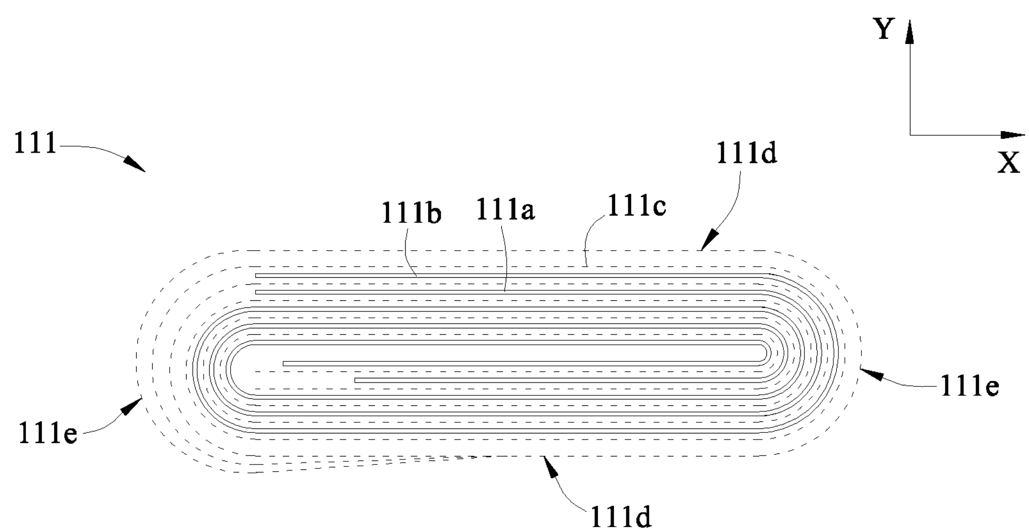
FIG. 3 is a schematic view of an embodiment of an electrode assembly of the battery according to the present disclosure.

As shown in FIG. 3, in an embodiment, the electrode assembly 111 is a winding structure. Specifically, the first electrode plate 111*a*, the second electrode plate 111*b* and the separator 111*c* are belt-shaped structures. The first electrode plate 111*a*, the separator 111*c* and the second electrode plate 111*b* are stacked sequentially and wound to two or more turns to form the electrode assembly 111, and the electrode assembly 111 is in a flat shape. When preparing the electrode assembly 111, the electrode assembly 111 is wound to a hollow cylindrical structure first, and then the electrode assembly 111 is pressed to a flat shape after winding. FIG. 3 is a schematic view showing a profile of the electrode assembly 111. The outer surface of the electrode assembly 111 comprises two first surfaces 111*d* and two second surfaces 111*e*, the two first surfaces 111*d* are flat surfaces and face each other in the second direction Y, the two second surfaces 111*e* face each other in the first direction X. The first surface 111*d* is substantially parallel to a winding axis of the electrode assembly 111. The first surface 111*d* is a relatively flat surface and not required to be an absolute plane. At least a part of the second surface 111*e* is in the shape of arc. An area of the first surface 111*d* is larger than an area of the second surface 111*e*.

The first surface 111*d* faces the second side wall 112*b* in the second direction Y, and the second surface 111*e* faces the first side wall 112*a* in the first direction X. The second surface 111*e* facing the first side wall 112*a* has a smaller area, so the heat transferred to the first side wall 112*a* from the electrode assembly 111 is less, thereby reducing the influence of the electrode assemblies 111 of two adjacent batteries 11 on each other's temperature. The first surface 111*d* facing the second side wall 112*b* has a larger area, so most of the heat in the electrode assembly 111 is dissipated to outside via the second side wall 112*b*.

In the charge process or discharge process of the electrode assembly 111, the electrode plate expands along its thickness direction. In the electrode assembly 111 having winding structure, an expanding force along a direction perpendicular to the first surface 111*d* is largest. In other words, in the present disclosure, by making the second surface 111*e* face the first side wall 112*a*, it can reduce the expanding force applied to the first side wall 112*a* by the electrode assembly 111. In the present disclosure, the batteries 11 are arranged in the first direction X, so even though the expanding forces of all the electrode assemblies 111 are accumulated in the first direction X, it will not generate an excessive composite force, thereby reducing the risk that the battery 11 is crushed.

In addition, at least a part of the second surface 111*e* is a circular arc surface. Compared to flat surface, a larger gap is kept between the circular arc surface and the first side wall 112*a*, and the gap can function as buffering, to decrease the expanding force applied to the first side wall 112*a* by the second surface 111*e*. In addition, the circular arc surface also can decrease the heat transferred to the first side wall 112*a*, reduce the influence of the electrode assemblies 111 of two adjacent batteries 11 on each other's temperature.

Preferably, the area $S_1$ of the first side wall 112*a* and the distance D between the electrode assemblies 111 of two adjacent batteries 11 in the first direction X satisfy a relationship: $5\times10^{-5}\ mm^{-1}\leq D/S_1\leq200\times10^{-5}\ mm^{-1}$.

The battery module 1 further comprises a first adhesive member 12, and the first adhesive member 12 is positioned between two adjacent batteries 11 and connects the first side walls 112*a* of the two adjacent batteries 11. The two adjacent batteries 11 may transfer heat to each other via the first adhesive member 12.

The first adhesive member 12 is a solid adhesive. The adhesive is liquid or paste before solidification, the adhesive is coated between the first side walls 112*a* of the two batteries 11 and solidifies, thereby firmly connecting the two batteries 11. The adhesive is one or more selected from a group consisting of epoxy resin, polyurethane and acrylic resin.

An area of the first side wall 112*a* covered by the first adhesive member 12 is defined as $S_3$, $S_3$ and $S_1$ satisfy a relationship: $0.25\leq S_3/S_1\leq0.95$. The larger a value of $S_3/S_1$ is, the larger the heat transfer area between two connected batteries 11 is, and the higher the heat transfer rate is. When one battery 11 suffers thermal runaway, an adjacent battery 11 is easy to suffer thermal runaway. In addition, the larger the value of $S_3/S_1$ is, the smaller an exposed region of the first side wall 112*a* is, the lower the heat dissipation efficiency to outside is, and the more easily the heat accumulation of the electrode assembly 111 under normal working state is generated. The smaller the value of $S_3/S_1$ is, the lower the connecting strength between the first adhesive member 12 and the first side wall 112*a* is; when the battery pack vibrates, the first adhesive member 12 is easily detached from the first side wall 112*a*, which leads to the overall strength of the battery module 1 reducing, and results in a risk that the battery 11 is detached from the box 2. The applicant comprehensively considers the heat dissipation and the connecting strength of the batteries 11, preferably, $0.25\leq S_3/S_1\leq0.95$. Further, a value of $S_3$ is $1500\ mm^2$-$16000\ mm^2$.

A thickness of the first adhesive member 12 is defined as T. The larger a value of T is, the larger the value of D is larger, the longer the heat transfer path between the electrode assemblies 111 of two adjacent batteries 11 is, and the less influence of the electrode assemblies 111 of two adjacent batteries 11 on each other's temperature is. The larger the value of T is, and the larger the space occupied by the first adhesive member 12 is.

The value of $S_3$ and the value of T can influence the heat transfer efficiency between adjacent batteries 11, preferably, $S_3$ and T satisfy a relationship: $300\ mm\leq S_3/T\leq32000\ mm$. Preferably, the value of T is 0.5 mm-5 mm.

If the value of $S_3/T$ is smaller than 300 mm, the value of $S_3$ is smaller and the value of T is larger. The value of $S_3$ is smaller, which leads to the connecting strength between the first adhesive member 12 and the first side wall 112*a* insufficient; the value of T is larger, which leads to the first adhesive member 12 occupying a larger space and reduces energy density.

If the value of $S_3/T$ is larger than 32000 mm, the value of $S_3$ is larger and the value of T is smaller. The larger the value of $S_3$ is larger, so the heat transfer area between adjacent batteries 11 is larger; the value of T is smaller, so the heat transfer path between the electrode assemblies 111 of two adjacent batteries 11 is shorter. At this time, the electrode assemblies 111 of two adjacent batteries 11 have more influence on each other's temperature, when one battery 11 suffers thermal runaway, and an adjacent battery 11 is also easy to suffer thermal runaway.

In the charge process or discharge process of the battery 11, the electrode assembly 111 expands and press the first side wall 112*a*; correspondingly, the first adhesive member 12 is compressed by the deformed first side wall 112*a*. The larger the compressed degree of the first adhesive member 12 is, the smaller the value of D is, and the more the influence of the electrode assemblies 111 of two adjacent batteries 11 on each other's temperature is.

An elastic modulus of the first adhesive member 12 is defined as E. The larger a value of E is, the lower the compressed degree of the first adhesive member 12 is, and the less the influence of electrode assemblies 111 of two adjacent batteries 11 on each other's temperature is. Certainly, the first adhesive member 12 applies a larger reaction force to the first side wall 112*a* and the electrode assembly 111; a partial area of the electrode assembly 111 is subjected to the larger reaction force, which leads to the inside electrolyte being extruded out, the infiltration capability of the partial area of the electrode assembly 111 being reduced, the lithium-ion being unable to pass through the separator 111*c* and causes the lithium precipitation. The smaller the value of E is, the greater the compressed degree of the first adhesive member 12 is, the shorter the heat transfer path between the electrode assemblies 111 of two adjacent batteries 11 is, and the more the influence of the electrode assemblies 111 of two adjacent batteries 11 on each other's temperature. The value of E may be 100 MPa-800 MPa.

By comprehensive consideration, the applicant preferably make E and T satisfy a relationship: $E\times T\geq50$ MPa·mm. When the value of T is smaller, the heat transfer path between the electrode assemblies 111 of two adjacent batteries 11 is shorter, at this time, the first adhesive member 12 has a larger elastic modulus to decrease the compressed degree of the first adhesive member 12, reduce the influence of the electrode assemblies 111 of two batteries 11 on each other's temperature. When the value of T is larger, the heat transfer path between the electrode assemblies 111 of two adjacent batteries 11 is longer, at this time, the first adhesive member 12 can have a smaller elastic modulus; even though the compressed degree of the first adhesive member 12 is large, the length of the heat transfer path between the electrode assemblies 111 of two adjacent batteries 11 still satisfies requirement; in addition, a smaller elastic modulus further can release the expanding force of the electrode assembly 111, reduce the risk of lithium precipitation, and improve the dynamics performance of battery 11.

A thermal conductivity of the first adhesive member 12 is 0.2 W/(m·K)-0.5 W/(m·K). The first adhesive member 12 has a smaller thermal conductivity, so as to decrease the heat transfer rate of the first adhesive member 12, reduce the influence of the electrode assemblies 111 of two adjacent batteries 11 on each other's temperature.

In the battery module 1 of the present disclosure, referring to FIG. 1, the batteries 11 also can be stacked in the second direction Y. Preferably, a number of layers of the batteries 11 in the second direction Y are 2-3. In the second direction Y, the second side walls 112*b* of two adjacent batteries 11 may be connected via a second adhesive member 13. Certainly, the area $S_2$ of the second side wall 112*b* is larger, so in the second direction Y, the two adjacent batteries 11 influence each other's temperature easily. Preferably, in the present disclosure, the number of the batteries 11 arranged in the second direction Y is far less than the number of the batteries 11 arranged in the first direction X, when one battery 11 suffers thermal runaway, it can decrease the number of the batteries 11 influenced by the battery 11 suffering thermal runaway as much as possible.

Correspondingly, a dimension of the battery module 1 in the first direction X is larger than a dimension of the battery module 1 in the second direction Y. The expanding force of the battery 11 in the second direction Y is largest, in the present disclosure, by reducing the number of layers of the batteries 11 stacked in the second direction Y, it can decrease the largest expanding force of the battery module 1 and avoid the batteries 11 being crushed. A height dimension of a chassis of the vehicle body is limited, so the first direction X is preferably parallel to the horizontal direction, the second direction Y is preferably parallel to the vertical direction, so as to decrease the space occupied by the battery pack.

The smaller the value of $S_1$ is, the thinner the battery 11 is; when a dimension of the battery pack in the second direction Y is constant, the number of layers of the batteries 11 stacked in the second direction Y is more; at the same time, in the first direction X, the heat transfer area between adjacent batteries 11 is smaller. The larger the value of $S_1$ is, the thicker the battery 11 is, and the less the number of layers of the batteries 11 stacked in the second direction Y is; at the same time, in the first direction X, the heat transfer area between adjacent batteries 11 is larger.

The smaller the value of $S_2$ is, in the second direction Y, the smaller the heat transfer area between adjacent batteries 11 is; the larger the value of $S_2$ is, in the second direction Y, the larger the heat transfer area between adjacent batteries 11 is.

The applicant comprehensively considers the influence of $S_1$ and $S_2$ on the battery 11, preferably the value of $S_1/(S_1+S_2)$ is 0.1-0.4. When the value of $S_1/(S_1+S_2)$ is smaller than 0.1, the value of $S_1$ is smaller and the value of $S_2$ is larger; at this time, in the second direction Y, the number of layers of the stacked batteries 11 is more, and the heat transfer area between the adjacent batteries 11 is larger, so when one battery 11 suffers thermal runaway, the other battery 11 adjacent to the one battery 11 in the second direction Y is easily influenced by the one battery 11, and the other battery 11 has a higher risk of thermal runaway. When the value of $S_1/(S_1+S_2)$ is larger than 0.4, the value of $S_1$ is larger and the value of $S_2$ is smaller. At this time, in the first direction X, the heat transfer area between two adjacent batteries 11 is larger, when one battery 11 suffers thermal runaway, the other battery 11 adjacent to the one battery 11 in the first direction X is easily influenced by the one battery 11, and the other battery 11 has a higher risk of thermal runaway.

A thickness of the first side wall 112*a* is 0.1 mm-1.5 mm. The thickness of the first side wall 112*a* is smaller, then the value of D is smaller, the electrode assemblies 111 of two adjacent batteries 11 are easy to influence each other's temperature. The thickness of the first side wall 112*a* is larger, and then the case 112 will occupy a larger space and have a larger weight, which reduces the energy density of the battery pack.

A thermal conductivity of the first side wall 112*a* is 100 W/(m·K)-250 W/(m·K). The first side wall 112*a* has a higher thermal conductivity, which helps heat dissipation to outside and avoids heat accumulation.

Figure 4:
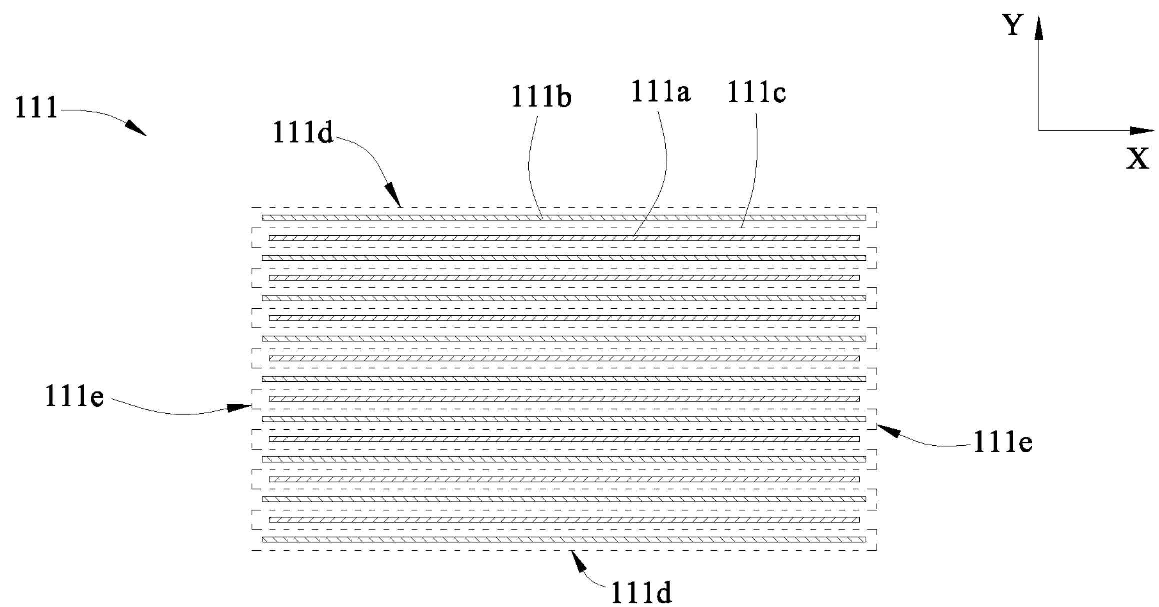
FIG. 4 is a schematic view of another embodiment of the electrode assembly of the battery according to the present disclosure.

In an alternative embodiment, as shown in FIG. 4, the electrode assembly 111 is a stacking structure. Specifically, the electrode assembly 111 comprises a plurality of first electrode plates 111*a* and a plurality of second electrode plates 111*b*; the separator 111*c* is provided between the first electrode plate 111*a* and the second electrode plate 111*b*. The first electrode plates 111*a* and the second electrode plates 111*b* are stacked in the second direction Y. In the stacking structure, the first electrode plate 111*a* and the second electrode plate 111*b* are in the shape of plate and substantially perpendicular to the second direction Y. FIG. 4 is a schematic view showing a profile of the electrode assembly 111. The outer surface of the electrode assembly 111 comprises two first surfaces 111*d* and two second surfaces 111*e*, the two first surfaces 111*d* face each other in the second direction Y, the two second surfaces 111*e* face each other in the first direction X. The first surface 111*d* is a relatively flat surface and not required to be an absolute plane. An area of the first surface 111*d* is larger than an area of the second surface 111*e*.

The first surface 111*d* faces the second side wall 112*b* in the second direction Y, and the second surface 111*e* faces the first side wall 112*a* in the first direction X. The second surface 111*e* facing the first side wall 112*a* has a smaller area, so the heat transferred to the first side wall 112*a* from the electrode assembly 111 is less, thereby reducing the influence of the electrode assemblies 111 of two adjacent batteries 11 on each other's temperature. The first surface 111*d* facing the second side wall 112*b* has a larger area, so most of the heat in the electrode assembly 111 is dissipated to outside via the second side wall 112*b*.

In the charge process or discharge process of the electrode assembly 111, the electrode plate expands along its thickness direction. In the electrode assembly 111 having stacking structure, an expanding force along a direction perpendicular to the first surface 111*d* is largest. In other words, in the present disclosure, by making the second surface 111*e* face the first side wall 112*a*, it can reduce the expanding force applied to the first side wall 112*a* by the electrode assembly 111. In the present disclosure, the batteries 11 are arranged in the first direction X, so even though the expanding forces of all the electrode assemblies 111 are accumulated in the first direction X, it will not generate an excessive composite force, thereby reducing the risk that the battery 11 is crushed.

Hereinafter the present disclosure will be further described in detail in combination with the examples.

A battery module of an example 1 could be prepared according to the following steps:

(i) NCM523 (positive active material), acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on an aluminum foil, drying was then performed under room temperature and continual drying was performed in an oven, which was then followed by cold pressing, slitting and plate cutting, finally the positive electrode plate was obtained.

(ii) Graphite or a mixer of graphite and other active materials with a certain mass ratio (negative active material), acetylene black (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on a copper foil, drying was then performed under room temperature and continual drying was performed in an oven, which was then followed by cold pressing, slitting and plate cutting, finally the negative electrode plate was obtained.

(iii) Ethylene carbonate (EC), ethyl methyl carbonate (EMC) and diethyl carbonate (DEC) according to a volume ratio of 1:1:1 were mixed together to obtain an organic solvent, then sufficiently dried $LiPF_6$ (lithium salt) was dissolved into the mixed organic solvent to obtain an electrolyte, and a concentration of the electrolyte was 1 mol/L.

(iv) The separator was a polyethylene membrane.

(v) The first electrode plate 111*a*, the separator 111*c* and the second electrode plate 111*b* were stacked sequentially and wound to turns, which then was pressed to a flat shape to form an electrode assembly 111. The electrode assembly 111 had two first surfaces 111*d* having larger areas and two second surfaces 111*e* having smaller areas.

(vi) The electrode assembly 111 and a cap assembly 113 were connected, then the electrode assembly 111 was placed into the case 112, and a cap plate 113*a* of the cap assembly 113 was welded with the case 112; finally, after electrolyte injection, standby, formation, shaping and the like, a battery 11 was obtained. A wall of the case 112 facing the second surface 111*e* was defined as the first side wall 112*a*, a wall of the case 112 facing the first surface 111*d* was defined as the second side wall 112*b*. In a direction perpendicular to the first side wall 112*a*, a dimension of the case 112 was 180 mm; in a direction perpendicular to the second side wall 112*b*, a dimension of the case 112 was 50 mm; in a direction parallel to the first side wall 112*a* and the second side wall 112*b*, a dimension of the case 112 was 190 mm. After calculation, an area $S_1$ of the first side wall 112*a* was 9500 $mm^2$, an area $S_2$ of the second side wall 112*b* was 34200 $mm^2$.

(vii) An adhesive was coated on one first side wall 112*a* of one battery 11, and then the first side wall 112*a* of another battery 11 was attached to the adhesive. A first adhesive member 12 was formed after curing the adhesive. The first adhesive member 12 connected the two batteries 11 together. An area $S_3$ of the first side wall 112*a* covered by the first adhesive member 12 was 5000 $mm^2$, a thickness T of the first adhesive member 12 was 1 mm, and the elastic modulus E of the first adhesive member 12 was 450 MPa.

(viii) A distance D between the electrode assemblies 111 of the two batteries 11 was detected by using of X-ray CT scanner.

In addition, by adjusting the size of the case 112, the winding turns in step (v), the thickness T of the first adhesive member 12 in step (vii) and other parameters, it could change the distance D between the electrode assemblies 111 of the two batteries 11. In step (vii), by adjusting coating area and coating thickness of the adhesive, it might change the value of $S_3$ and the value of T. By changing the component of the adhesive, it might adjust the elastic modulus E of the first adhesive member 12. The elastic modulus E of the first adhesive member 12 could be measured by a DMA-Q800 detector.

Battery modules of examples 2-30 and battery modules of comparative examples 1-5 all could be prepared in accordance with the preparing method of the battery module of the example 1. The differences among the battery modules of the examples 1-30 and the battery modules of comparative examples 1-5 were the distance D between the electrode assemblies 111 of the two batteries 11 in the first direction X, the area $S_1$ of the first side wall 112*a*, the area $S_3$ of the first side wall 112*a* covered by the first adhesive member 12, the thickness T of the first adhesive member 12 and the elastic modulus E of the first adhesive member 12.

Hereinafter test processes of the battery modules prepared in the examples 1-35 and the comparative examples 1-5 were described.

Test of nail puncture.

In a closed environment, two batteries 11 were fixed by a jig, and then the two batteries 11 were charged and discharged. Then one battery 11 was punctured by a nail, and the one battery 11 punctured by the nail short-circuited and suffered thermal runaway. Finally, the time of the other battery 11 which would suffer thermal runaway was observed, and the time interval M between the times of the two batteries 11 suffering thermal runaway was recorded. A manifestation of thermal runaway was smoke.

Test of Cycle Performance.

At normal temperature, the two batteries 11 were charged at a constant current of 1 C and discharged at a constant current of 1 C, the fully charging/discharging cycle process was repeated until the capacity of one battery 11 decayed to 80% of the initial capacity, and the cycle number N of the one battery 11 was recorded.

Each example was provided as ten sets; five sets of each example were used for test of nail puncture and the time intervals M of the five sets were averaged; the other five sets of each example were used for test of cycle performance and cycle numbers N of the other five sets were averaged. Each comparative example were provided as ten sets; five sets of each comparative example were used for test of nail puncture and the time intervals M of the five sets were averaged; the other five sets of each comparative example were used for test of cycle performance and cycle numbers N of the other five sets were averaged.

Referring to the comparative examples 1-2, when the value of $D/S_1$ was smaller than $1.2\times10^{-5}$, the heat transfer path between the normal battery 11 and the battery 11 punctured by the nail was shorter, and the heat transfer area was larger, under the influence of the battery 11 punctured by the nail, the normal battery 11 would suffer thermal runaway within 10 min. The battery 11 was generally used as a power mechanism for electric vehicle, if the value of $D/S_1$ was smaller than $1.2\times10^{-5}$, the time interval between the two batteries 11 suffering thermal runaway was shorter, which led to the battery module exploding in a shorter time, thereby resulting in safety accident. Referring to the comparative examples 3-5, when the value of $D/S_1$ was larger than $500\times10^{-5}$, the heat generated in the electrode assembly 111 working normally was not easily dissipated to outside, which led to the heat being accumulated inside the electrode assembly 111, resulted in the number of cycles of the battery 11 being less than 1200 and seriously influenced the cycle performance of the battery 11.

Referring to the examples 1-30 of the present disclosure, it made the value of $D/S_1$ satisfy a relationship "$1.2\times10^{-5}$ $mm^{-1}\leq D/S_1\leq 500\times10^{-5}$ $mm^{-1}$" to balance the safety performance and the cycle performance of the battery 11. Specifically, in the present disclosure, it made the value of $D/S_1$ be larger than or equal to $1.2\times10^{-5}$ $mm^{-1}$, to extend the time interval of two batteries 11 suffering thermal runaway, reserve more reaction time for passengers and reduce safety risk. In the present disclosure, it made the value of $D/S_1$ smaller than or equal to $500\times10^{-5}$ $mm^{-1}$, to reduce heat accumulation generated in the electrode assembly 111 working normally and promote the cycle performance of the battery 11.

Referring to the examples 1-7, when other parameters were determined, it could adjust the safety performance and the cycle performance of the battery by changing the value of D. By increasing the value of D, it could effectively extend the time interval of the two batteries 11 suffering thermal runaway; however, when the value of D increased, the cycle performance of battery 11 would reduce correspondingly.

Referring to the examples 2 and 8-14, when other parameters were determined, it also could adjust the safety performance and the cycle performance of the battery by changing the value of $S_1$. By increasing the value of $S_1$, it could increase cycle numbers of the battery 11, promote the cycle performance of battery 11. However, when the value $S_1$ increased, the time interval of two batteries 11 suffering thermal runaway would be shorten.

Therefore, the applicant comprehensively considered the influences of D and $S_1$ on the safety performance and the cycle performance of the battery 11, preferably, the D and $S_1$ satisfied a relationship: $5\times10^{-5}\ mm^{-1}\leq D/S_1\leq 200\times10^{-5}\ mm^{-1}$.

Referring to the examples 2 and 21-23, when other parameters were determined, it could adjust the safety performance and the cycle performance of the battery by changing the value of $S_3$. The larger the value of $S_3$ was, the larger the heat transfer area between the two batteries 11 was, and the shorter the time interval of the two batteries 11 suffering thermal runaway was; at the same time, the smaller the exposed region of the first side wall 112*a* was, the lower the heat dissipation efficiency of the first side wall 112*a* was, and the more easily the electrode assembly 111 under normal working state generated heat accumulation. Therefore, on the premise that the connecting strength between the two batteries 11 was ensured, it could promote the safety performance and cycle performance of battery 11 by decreasing the value of $S_3$.

Referring to the examples 2 and 24-27, when other parameters were determined, it could adjust the safety performance of battery 11 by changing the value of T. In the examples 2 and 24-27, the value of T was directly proportional to the value of D. When the value of T increased, the value of D would increase correspondingly, which could extend the heat transfer path and the time interval of the two batteries 11 suffering thermal runaway. At the same time, when the value of T increased, the distance between the electrode assembly 111 and the first side wall 112*a* did not change; in other words, when the value of T increased, it has a less influence on the heat dissipation of the electrode assembly 111 in normal working state. Certainly, considering space utilization, the value of T could not be excessively large.

Referring to the examples 2 and 28-30, when other parameters were determined, it could adjust the safety performance and the cycle performance of battery 11 by changing the value of E. The larger the value of E value was, the lower the compressed degree of the first adhesive member 12 was, and the less the influence of the electrode assemblies 111 of two adjacent batteries 11 on each other's temperature was. Certainly, the larger the reaction force applied to the first side wall 112*a* and the electrode assembly 111 by the first adhesive member 12 was; a partial area of the electrode assembly 111 was subjected to a larger reaction force, which led to the inside electrolyte being extruded out, the infiltration capability of the partial area of the electrode assembly 111 being reduced, and the lithium-ion being unable to pass through the separator 111*c* and caused the lithium precipitation. The smaller the value of E was, the larger the compressed degree of the first adhesive member 12 was, the shorter the heat transfer path between the electrode assemblies 111 of two adjacent batteries 11 was, and the more the influence of the electrode assemblies 111 of two adjacent batteries 11 on each other's temperature was. The applicant comprehensively considered the influence of E on the safety performance and the cycle performance of the battery 11, the value of E was preferably 300 MPa-600 MPa.

TABLE 1

Parameters and test results of examples 1-30 and comparative examples 1-5

| | D(mm) | $S_1(mm^2)$ | $S_3(mm^2)$ | T(mm) | E(MPa) | $D/S_1(mm^{-1})$ | $S_3/S_1$ | $S_3/T(mm)$ | E × T(MPa · mm) | M(min) | N |
|---|---|---|---|---|---|---|---|---|---|---|---|
| Example 1 | 2 | 9500 | 5000 | 1 | 450 | $21\times10^{-5}$ | 0.52 | 5000 | 450 | 11.8 | 1548 |
| Example 2 | 3.5 | 9500 | 5000 | 1 | 450 | $36\times10^{-5}$ | 0.52 | 5000 | 450 | 12.1 | 1510 |
| Example 3 | 5 | 9500 | 5000 | 1 | 450 | $52\times10^{-5}$ | 0.52 | 5000 | 450 | 12.4 | 1479 |
| Example 4 | 7 | 9500 | 5000 | 1 | 450 | $73\times10^{-5}$ | 0.52 | 5000 | 450 | 12.9 | 1442 |
| Example 5 | 10 | 9500 | 5000 | 1 | 450 | $105\times10^{-5}$ | 0.52 | 5000 | 450 | 13.2 | 1409 |
| Example 6 | 15 | 9500 | 5000 | 1 | 450 | $157\times10^{-5}$ | 0.52 | 5000 | 450 | 13.7 | 1367 |
| Example 7 | 20 | 9500 | 5000 | 1 | 450 | $210\times10^{-5}$ | 0.52 | 5000 | 450 | 14 | 1311 |
| Example 8 | 3.5 | 4000 | 2080 | 1 | 450 | $87\times10^{-5}$ | 0.52 | 2080 | 450 | 13 | 1428 |
| Example 9 | 3.5 | 6000 | 3120 | 1 | 450 | $58\times10^{-5}$ | 0.52 | 3120 | 450 | 12.6 | 1468 |
| Example 10 | 3.5 | 10000 | 5200 | 1 | 450 | $35\times10^{-5}$ | 0.52 | 5200 | 450 | 12 | 1517 |
| Example 11 | 3.5 | 15000 | 7800 | 1 | 450 | $23\times10^{-5}$ | 0.52 | 7800 | 450 | 11.9 | 1539 |
| Example 12 | 3.5 | 30000 | 15600 | 1 | 450 | $11\times10^{-5}$ | 0.52 | 15600 | 450 | 11.4 | 1559 |
| Example 13 | 3.5 | 60000 | 31200 | 1 | 450 | $5.8\times10^{-5}$ | 0.52 | 31200 | 450 | 10.9 | 1577 |
| Example 14 | 3.5 | 80000 | 41600 | 1 | 450 | $4.3\times10^{-5}$ | 0.52 | 41600 | 450 | 10.8 | 1586 |
| Example 15 | 1 | 83000 | 43200 | 0.2 | 450 | $1.2\times10^{-5}$ | 0.52 | 216000 | 450 | 10.4 | 1596 |
| Example 16 | 1.2 | 75000 | 39000 | 0.2 | 450 | $1.6\times10^{-5}$ | 0.52 | 195000 | 450 | 10.4 | 1592 |
| Example 17 | 2 | 40000 | 21000 | 0.5 | 450 | $5\times10^{-5}$ | 0.52 | 42000 | 450 | 10.9 | 1581 |
| Example 18 | 12 | 6000 | 3120 | 1 | 450 | $200\times10^{-5}$ | 0.52 | 3120 | 450 | 13.9 | 1327 |
| Example 19 | 10 | 4000 | 2080 | 1 | 450 | $250\times10^{-5}$ | 0.52 | 2080 | 450 | 14.2 | 1293 |
| Example 20 | 20 | 4000 | 2080 | 1 | 450 | $500\times10^{-5}$ | 0.52 | 2080 | 450 | 14.8 | 1256 |
| Example 21 | 3.5 | 9500 | 2375 | 1 | 450 | $36\times10^{-5}$ | 0.25 | 2375 | 450 | 12.3 | 1528 |
| Example 22 | 3.5 | 9500 | 5700 | 1 | 450 | $36\times10^{-5}$ | 0.6 | 5700 | 450 | 12 | 1507 |
| Example 23 | 3.5 | 9500 | 9000 | 1 | 450 | $36\times10^{-5}$ | 0.95 | 9000 | 450 | 10.7 | 1489 |
| Example 24 | 3 | 9500 | 5000 | 0.5 | 450 | $31\times10^{-5}$ | 0.52 | 10000 | 225 | 11.6 | 1501 |
| Example 25 | 4.5 | 9500 | 5000 | 2 | 450 | $47\times10^{-5}$ | 0.52 | 2500 | 900 | 12.2 | 1511 |
| Example 26 | 5.5 | 9500 | 5000 | 3 | 450 | $58\times10^{-5}$ | 0.52 | 1666 | 1350 | 12.4 | 1516 |
| Example 27 | 7.5 | 9500 | 5000 | 5 | 450 | $79\times10^{-5}$ | 0.52 | 1000 | 2250 | 12.9 | 1520 |
| Example 28 | 3.5 | 9500 | 5000 | 1 | 100 | $36\times10^{-5}$ | 0.52 | 5000 | 100 | 11.6 | 1537 |
| Example 29 | 3.5 | 9500 | 5000 | 1 | 300 | $36\times10^{-5}$ | 0.52 | 5000 | 300 | 11.9 | 1521 |
| Example 30 | 3.5 | 9500 | 5000 | 1 | 800 | $36\times10^{-5}$ | 0.52 | 5000 | 800 | 12.7 | 1433 |
| Comparative example 1 | 1 | 100000 | 52000 | 0.2 | 450 | $1\times10^{-5}$ | 0.52 | 260000 | 450 | 9.7 | 1598 |
| Comparative example 2 | 1 | 200000 | 104000 | 0.2 | 450 | $0.5\times10^{-5}$ | 0.52 | 520000 | 450 | 9.3 | 1601 |

TABLE 1-continued

| Parameters and test results of examples 1-30 and comparative examples 1-5 | | | | | | | | | | | |
|---|---|---|---|---|---|---|---|---|---|---|---|
| | D(mm) | $S_1$(mm$^2$) | $S_3$(mm$^2$) | T(mm) | E(MPa) | $D/S_1$(mm$^{-1}$) | $S_3/S_1$ | $S_3$/T(mm) | E × T(MPa · mm) | M(min) | N |
| Comparative example 3 | 8 | 1000 | 520 | 1 | 450 | $800 \times 10^{-5}$ | 0.52 | 520 | 450 | 15.6 | 1168 |
| Comparative example 4 | 10 | 1000 | 520 | 1 | 450 | $1000 \times 10^{-5}$ | 0.52 | 520 | 450 | 15.9 | 1105 |
| Comparative example 5 | 20 | 1000 | 520 | 1 | 450 | $2000 \times 10^{-5}$ | 0.52 | 520 | 450 | 16.1 | 1089 |

What is claimed is:

1. A battery module, comprising batteries sequentially arranged in a first direction;

each battery comprising an electrode assembly, a case and a cap assembly, the electrode assembly being received in the case, and the cap assembly being connected with the case;

the case comprising two first side walls, and the two first side walls being respectively positioned at two opposite sides of the electrode assembly in the first direction;

the first side walls of two adjacent batteries facing each other;

an area of the first side wall being defined as $S_1$, a distance between the electrode assemblies of two adjacent batteries in the first direction being defined as D, $S_1$ and D satisfying a relationship:

$$1.2\times10^{-5}\ mm^{-1} \le D/S_1 \le 500\times10^{-5}\ mm^{-1};$$

the case further comprising two second side walls, the two second side walls being respectively positioned at two opposite sides of the electrode assembly in a second direction, the second direction being perpendicular to the first direction;

an area of the second side wall being defined as $S_2$, and $S_2$ being larger than $S_1$, the electrode assembly comprising two first surfaces and two second surfaces, and an area of the first surface being larger than an area of the second surface;

the first surface facing the second side wall in the second direction, and the second surface facing the first side wall in the first direction;

the electrode assembly comprising a first electrode plate, a second electrode plate and a separator provided between the first electrode plate and the second electrode plate; and the first electrode plate, the separator and the second electrode plate being wound to a flat shape, and the two first surfaces being flat surfaces and face each other in the second direction; or the first electrode plate, the separator and the second electrode plate being stacked in the second direction;

the distance D between the electrode assemblies of two adjacent batteries in the first direction is 1.2 mm-10 mm, the area $S_1$ of the first side wall is 4000 mm$^2$-60000 mm$^2$.

2. The battery module according to claim 1, wherein the area $S_1$ of the first side wall and the distance D between the electrode assemblies of two adjacent batteries in the first direction satisfy a relationship:

$$1.6\times10^{-5}\ mm^{-1} \le D/S_1 \le 250\times10^{-5}\ mm^{-1}.$$

3. The battery module according to claim 1, wherein the first electrode plate, the separator and the second electrode plate are wound to a flat shape, and at least a part of the second surface is in the shape of arc.

4. The battery module according to claim 1, wherein a dimension of the battery module in the first direction is larger than a dimension of the battery module in the second direction.

5. The battery module according to claim 1, wherein the area $S_1$ of the first side wall and the distance D between the electrode assemblies of two adjacent batteries in the first direction satisfy a relationship:

$$5\times10^{-5}\ mm^{-1} \le D/S_1 \le 200\times10^{-5}\ mm^{-1}.$$

6. The battery module according to claim 1, wherein the battery module further comprises a first adhesive member, and the first adhesive member is positioned between two adjacent batteries and connects the first side walls of the two adjacent batteries;

an area of the first side wall covered by the first adhesive member is defined as $S_3$, $S_3$ and $S_1$ satisfy a relationship:

$$0.25 \le S_3/S_1 \le 0.95.$$

7. The battery module according to claim 6, wherein a thickness of the first adhesive member is defined as T, $S_3$ and T satisfy a relationship:

$$300\ mm \le S_3/T \le 32000\ mm.$$

8. The battery module according to claim 7, wherein an elastic modulus of the first adhesive member is defined as E, E and T satisfy a relationship:

$$E\times T \ge 50\ MPa\cdot mm.$$

9. The battery module according to claim 6, wherein the first adhesive member is an adhesive, and the adhesive is one or more selected from a group consisting of epoxy resin, polyurethane and acrylic resin.

10. A battery pack, comprising a box and a battery module;

the battery module being accommodated in the box;

the battery module comprising batteries sequentially arranged in a first direction;

each battery comprising an electrode assembly, a case and a cap assembly, the electrode assembly being received in the case, and the cap assembly being connected with the case;

the case comprising two first side walls, and the two first side walls being respectively positioned at two opposite sides of the electrode assembly in the first direction;

the first side walls of two adjacent batteries facing each other;

an area of the first side wall being defined as $S_1$, a distance between the electrode assemblies of two adjacent batteries in the first direction being defined as D, $S_1$ and D satisfying a relationship:

$$1.2\times10^{-5}\ mm^{-1} \le D/S_1 \le 500\times10^{-5}\ mm^{-1};$$

the case further comprising two second side walls, the two second side walls being respectively positioned at two opposite sides of the electrode assembly in a second direction, the second direction being perpendicular to the first direction;

an area of the second side wall being defined as $S_2$, and $S_2$ being larger than $S_1$, the electrode assembly comprising two first surfaces and two second surfaces, and an area of the first surface being larger than an area of the second surface;

the first surface facing the second side wall in the second direction, and the second surface facing the first side wall in the first direction;

the electrode assembly comprising a first electrode plate, a second electrode plate and a separator provided between the first electrode plate and the second electrode plate; and the first electrode plate, the separator and the second electrode plate being wound to a flat shape, and the two first surfaces being flat surfaces and face each other in the second direction; or the first electrode plate, the separator and the second electrode plate being stacked in the second direction;

a dimension of the battery module in the first direction is larger than a dimension of the battery module in the second direction.

11. The battery pack according to claim 10, wherein the battery module further comprises a first adhesive member, and the first adhesive member is positioned between two adjacent batteries and connects the first side walls of the two adjacent batteries;

an area of the first side wall covered by the first adhesive member is defined as $S_3$, $S_3$ and $S_1$ satisfy a relationship:

$$0.25 \le S_3/S_1 \le 0.95.$$

12. The battery pack according to claim 11, wherein a thickness of the first adhesive member is defined as T, $S_3$ and T satisfy a relationship:

$$300\ \text{mm} \le S_3/T \le 32000\ \text{mm}.$$

13. The battery pack according to claim 12, wherein an elastic modulus of the first adhesive member is defined as E, E and T satisfy a relationship:

$$E \times T \ge 50\ \text{MPa·mm}.$$

14. A vehicle, comprising a vehicle body and a battery pack provided to the vehicle body;

the battery pack comprising a box and a battery module; the battery module being accommodated in the box;

the battery module comprising batteries sequentially arranged in a first direction;

each battery comprising an electrode assembly, a case and a cap assembly, the electrode assembly being received in the case, and the cap assembly being connected with the case;

the case comprising two first side walls, and the two first side walls being respectively positioned at two opposite sides of the electrode assembly in the first direction;

the first side walls of two adjacent batteries facing each other;

an area of the first side wall being defined as $S_1$, a distance between the electrode assemblies of two adjacent batteries in the first direction being defined as D, $S_1$ and D satisfying a relationship:

$$1.2 \times 10^{-5}\ \text{mm}^{-1} \le D/S_1 \le 500 \times 10^{-5}\ \text{mm}^{-1};$$

the case further comprising two second side walls, the two second side walls being respectively positioned at two opposite sides of the electrode assembly in a second direction, the second direction being perpendicular to the first direction;

an area of the second side wall being defined as $S_2$, and $S_2$ being larger than $S_1$, the electrode assembly comprising two first surfaces and two second surfaces, and an area of the first surface being larger than an area of the second surface;

the first surface facing the second side wall in the second direction, and the second surface facing the first side wall in the first direction;

the electrode assembly comprising a first electrode plate, a second electrode plate and a separator provided between the first electrode plate and the second electrode plate; and the first electrode plate, the separator and the second electrode plate being wound to a flat shape, and the two first surfaces being flat surfaces and face each other in the second direction; or the first electrode plate, the separator and the second electrode plate being stacked in the second direction.

15. The vehicle according to claim 14, wherein the battery module further comprises a first adhesive member, and the first adhesive member is positioned between two adjacent batteries and connects the first side walls of the two adjacent batteries;

an area of the first side wall covered by the first adhesive member is defined as $S_3$, $S_3$ and $S_1$ satisfy a relationship:

$$0.25 \le S_3/S_1 \le 0.95.$$

16. The vehicle according to claim 15, wherein a thickness of the first adhesive member is defined as T, $S_3$ and T satisfy a relationship:

$$300\ \text{mm} \le S_3/T \le 32000\ \text{mm}.$$

17. The vehicle according to claim 16, wherein an elastic modulus of the first adhesive member is defined as E, E and T satisfy a relationship:

$$E \times T \ge 50\ \text{MPa·mm}.$$

18. The vehicle according to claim 14, wherein a dimension of the battery module in the first direction is larger than a dimension of the battery module in the second direction.

* * * * *